United States Patent [19]

Challoner et al.

[11] Patent Number: 4,825,646

[45] Date of Patent: May 2, 1989

[54] SPACECRAFT WITH MODULATED THRUST ELECTROSTATIC ION THRUSTER AND ASSOCIATED METHOD

[75] Inventors: A. Dorian Challoner, Manhattan Beach; Robert L. Poeschel, Thousand Oak, both of Calif.

[73] Assignee: Hughes Aircraft Company, Los Angeles, Calif.

[21] Appl. No.: 41,564

[22] Filed: Apr. 23, 1987

[51] Int. Cl.[4] .......................... F03H 1/00; H05H 1/16
[52] U.S. Cl. ........................................ 60/202; 60/204; 244/169; 313/360.1; 315/111.31
[58] Field of Search ................. 60/202, 201, 204, 233, 60/203.1; 244/169, 164, 171, 172, 176; 313/360.1, 111.31

[56] References Cited

U.S. PATENT DOCUMENTS

| | | | |
|---|---|---|---|
| 3,279,176 | 10/1966 | Boden | 244/172 |
| 3,328,960 | 7/1967 | Martin | 60/202 |
| 3,345,820 | 10/1967 | Dryden | 60/202 |
| 3,758,051 | 9/1973 | Williams . | |
| 3,956,666 | 5/1976 | Reader | 60/202 |
| 3,997,137 | 12/1976 | Phillips | 244/169 |
| 4,104,875 | 8/1978 | Birner et al. | 60/202 |
| 4,439,684 | 3/1984 | Hemmerich et al. | 313/360.1 |

FOREIGN PATENT DOCUMENTS

0132065 1/1985 European Pat. Off. .
2052014 4/1972 Fed. Rep. of Germany .

OTHER PUBLICATIONS

Journal of Propulsion and Power, vol. 1, No. 3, May--Jun. 1985, American Institute of Aeronautics and Astronautics, Inc., (New York, US), D.C. Rovang et al., "Ion Extraction Capabilities of Two-Grid Accelerator Systems", pp. 172-179 see FIG. 4, p. 174, left-hand col., paragraph Effect of Net-To-Total Accelerating Voltage Ratio.

Journal of Propulsion and Power, vol. 2, No. 6, Nov./-Dec. 1986, American Institute of Aeronautics and Astronautics, Inc., (New York, US), S. Kitamura et al., "ETS-III Ion Engine Flight Operations in the Extended Mission Period", pp. 513-520 see p. 514, right--hand col., paragraph 3, sentences 1,2; table 1, remark.

Primary Examiner—Donald E. Stout
Attorney, Agent, or Firm—Steven M. Mitchell; Mark J. Meltzer; A. W. Karambelas

[57] ABSTRACT

An axial electrostatic ion thruster for use on a dual-spin stabilized spacecraft is disclosed. The thruster is mounted on the spun portion of the spacecraft and continuously fired for an integral number of spin periods to provide north-south velocity and attitude control. To achieve zero attitude precession with a statically imbalanced despun platform, or an intentional attitude precession generally, the ion thrust is spin-synchronously varied between two non-zero levels to achieve a prescribed Fourier component amplitude and phase at the spin frequency. Modulation of the thrust is achieved with constant ion beam current by complementary modulation of the beam voltage, $V_B$, and accel voltage, $V_A$ by varying the ion extraction system grid voltages. This varies the thrust while maintaining a constant total accelerating voltage $V_{TOT}=V_B+|V_A|$.

13 Claims, 5 Drawing Sheets

Fig. 4.
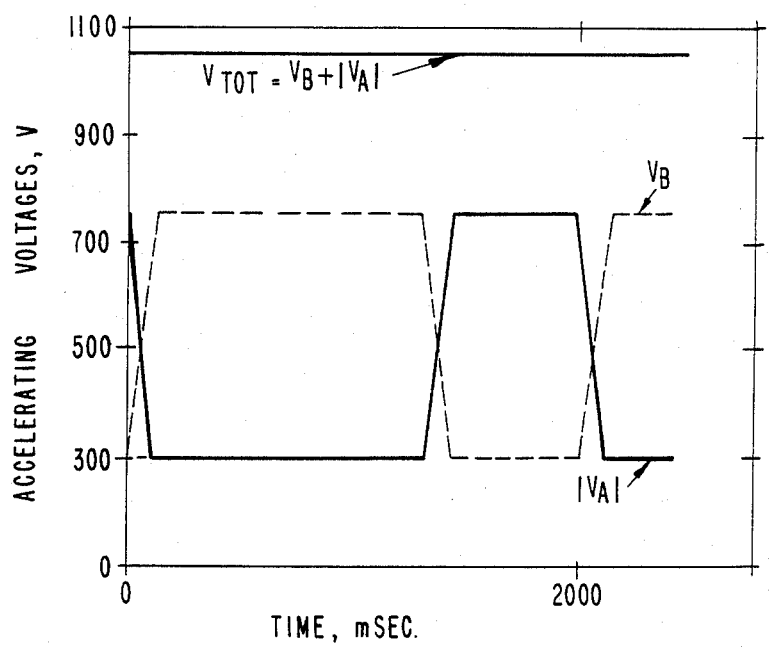
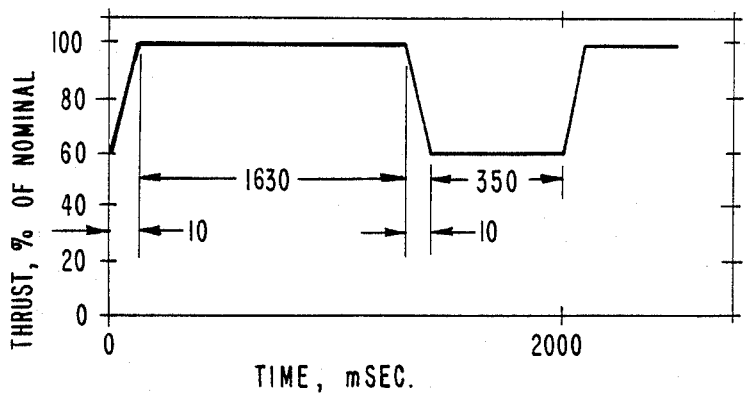
Fig. 5.

SPACECRAFT WITH MODULATED THRUST ELECTROSTATIC ION THRUSTER AND ASSOCIATED METHOD

BACKGROUND OF THE INVENTION

The present invention relates generally to spacecraft propulsion and more particularly to ion propulsion engines for use on a spinning spacecraft.

The concept of using an ion source to provide propulsion for a spacecraft has been known for a long time. Two early patents in this area are U.S. Pat. No. 3,052,088 to Davis et al and U.S. Pat. No. 3,156,090 to Kaufman, each of which describes an electrostatic ion propulsion device. However, almost all propulsion systems currently used for planetary or Earth orbital applications are chemical thrusters. There is an increasing need for thrusters providing the advantages of electrostatic ion thrusters because of an increasing demand for extended lifetime of orbital satellites. While satellite components can be made to function for extended operational periods in space, a limiting factor for satellite lifetime has been the depletion of stationkeeping propellant necessitating satellite retirement. The primary use of stationkeeping propellant is for north-south stationkeeping which must compensate for gravitational forces of the sun and moon which tend to increase the inclination of a geosynchronous orbit. For a given satellite, replacing the chemical liquid bipropellant with ion propulsion system hardware and propellant can as much a double the operational lifetime of the satellite. This is possible because of the very high specific impulse provided by an ion thruster as compared to chemical thrusters and because the power source for the ion thruster is the sun.

An ion thruster produces thrust by expelling propellant ions at high exhaust velocity. Typically the exhaust velocity and thus the specific impulse is selected on the basis of mission requirements for velocity increment, power available, and propellant requirement. There is usually an optimum value for the specific impulse. For a given exhaust velocity, thrust level is usually adjusted by varying the ion beam current, i.e. the number of ions ejected per unit time. For attitude control of a spinning satellite, large variations in ion beam current would be required to be accomplished in a relatively short time and this is not tractable for currently available ion thruster systems.

The idea of powering an ion propulsion subsystem for north-south stationkeeping (NSSK) from the batteries which are used on geosynchronous communication satellites for operation during eclipse periods was first suggested by B. A. Free in "Electric Propulsion for Communications Satellites," COMSAT TM CL-4-80, COMSAT Laboratories, January 1980. It has since been shown that there can be substantial economic benefits for communication satellites by reducing the amount of chemical propellant which must be carried through the installation of a high specific impulse ion propulsion subsystem to perform NSSK. R. L. Poeschel, "Ion Propulsion for Communications Satellites," JSA SS/AIAA/ DGLR Paper No. IEPC 84-43, Tokyo, Japan, May 1984.

In previously developed ion propulsion subsystems, mercury has been used for propellant because its high atomic mass results in a very high specific impulse (Isp), on the order of 3,000 seconds. However, the inert gas xenon provides performance very near that of mercury while resulting in several major simplifications in propellant handling.

It is desirable with a spin-stabilized satellite to have the thruster or thrusters for NSSK located off-axis to allow both velocity correction and spin-axis attitude correction by spin-synchronous modulation of the thrust. The use of off-axis chemical thrusters with on-off pulsing for attitude and velocity control is described in U.S. Pat. No. 3,758,051, to Williams. Thrust modulation or off-pulsing is also important for dual-spin satellites having a center of mass which is off the spin axis because it allows the spin-period averaged thrust to be directed through the spacecraft center of mass.

Off-pulse thrust modulation of ion propulsion thrusters presents problems not present with chemical thrusters. There is a significant start-up time, on the order of several minutes, required for these thrusters. Additionally, electromechanical modulation of the propellant flow rate into the plasma region is undesirable because of difficulty with precise control and repeated operation of mechanical valves reduces reliability.

OBJECTS OF THE INVENTION

It is therefore a primary object of the present invention to provide a satellite propulsion system not subject to the foregoing problems and disadvantages.

It is another object of the present invention to provide an electrostatic ion thruster capable of thrust modulation.

It is a further object of the present invention to provide a modulated thrust electrostatic ion thruster having a constant beam current.

It is still another object of the present invention to provide a modulated thrust electrostatic ion thruster which does not require repeated operation of mechanical valves.

It is still a further object of the present invention to provide a method of operating a modulated thrust electrostatic ion thruster.

It is another object of the invention to provide a method for modulating the thrust of an ion thruster to control spacecraft attitude without requiring a zero thrust level from the thruster.

It is yet another object of the present invention to provide a spin stabilized satellite having an extended operational lifetime.

It is still a further object of the present invention to provide a spin stabilized satellite having an off-axis center of mass with a modulated thrust electrostatic ion thruster for north-south stationkeeping.

SUMMARY OF THE INVENTION

The invention is directed to thrust modulation of an electrostatic ion thruster and its use on a spin-stabilized spacecraft. A modulated thrust electrostatic ion thruster is provided for north-south stationkeeping and attitude control of a spin-stabilized satellite which may have its center of mass off the satellite spin axis. This is accomplished by continuously firing the ion thruster for an integral number of spin periods while reducing the magnitude of the thrust of the ion thruster during a portion of each revolution of the satellite spun section on which the ion thruster is positioned. The thrust is varied between two non-zero levels by complementary modulation of the screen and accel electrode voltages while maintaining the beam current at its nominal value, thus maintaining a constant voltage difference between the two electrodes as their voltages relative to the spacecraft potential are varied. The modulation period and amplitude are calculated to provide a prescribed Fourier component thrust amplitude and phase at the spin frequency.

These and other objects of the present invention, together with the features and advantages thereof will become apparent from the following detailed specification when considered in conjunction with the accompanying drawings in which applicable reference numerals are carried forward.

BRIEF DESCRIPTION OF THE DRAWINGS

FIG. 4 is a graph showing a voltage modulation waveform used to provide the thrust modulation for the present invention;

FIG. 5 is a graph showing the thrust modulation resulting from the voltage modulation waveform of FIG. 4.

DETAILED DESCRIPTION OF THE INVENTION

Figure 1:
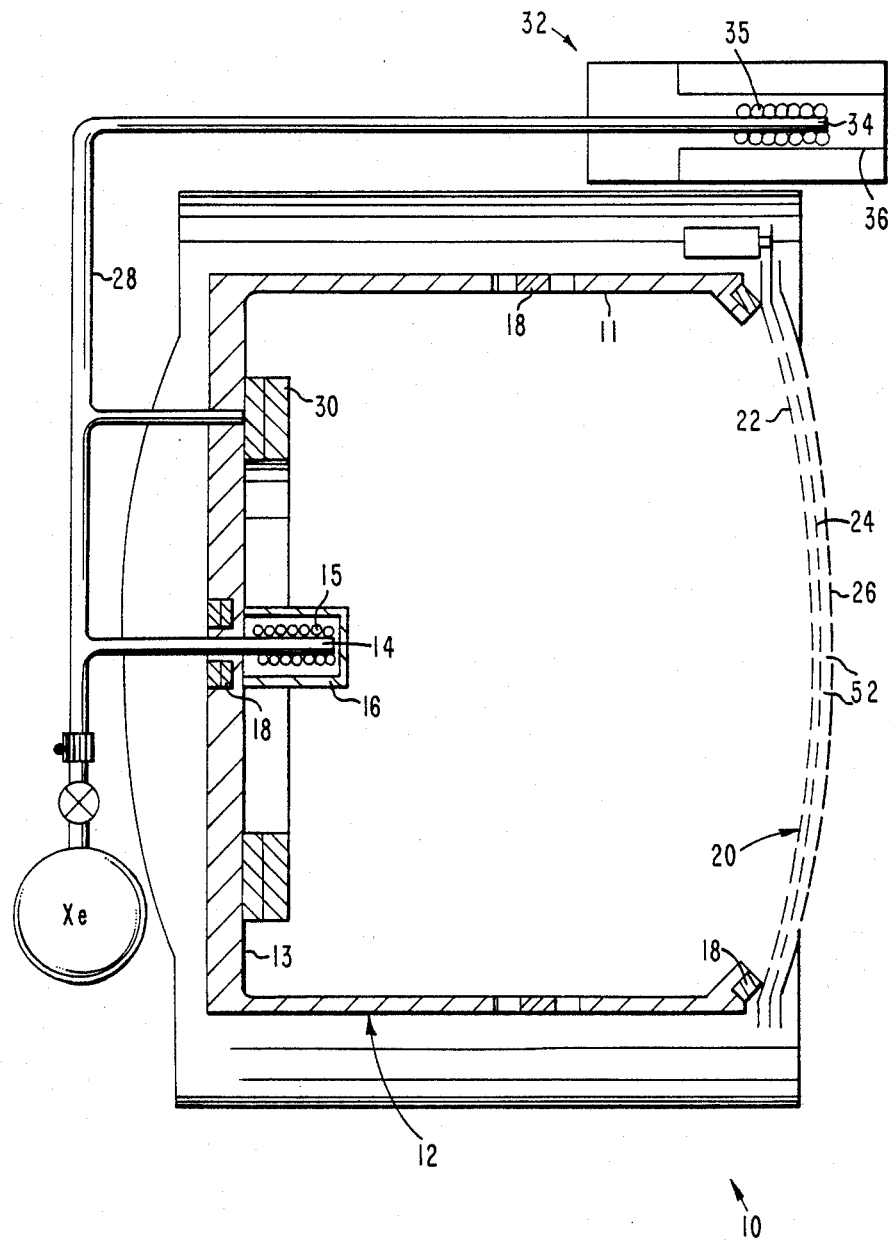
FIG. 1 is a schematic cross section of the electrostatic ion thruster of the present invention.

Referring now to the drawings, FIG. 1 shows a schematic cross section of an ion thruster 10. Ion thruster 10 is an electrostatic ion accelerator with an electron bombardment source. An ionization chamber 12 includes a cylindrical sidewall 11 and endwall 13 and is provided to contain a plasma generated by thermionic electrons from a cathode 14. The chamber sidewall 11 and endwall 13 also function as an anode to which electrons from the cathode 14 are accelerated. The cathode 14 is surrounded by a cathode heater 15 and enclosed by a cathode keeper 16. An arrangement of permanent magnet rings 18 surrounds portions of the ionization chamber 12. An ion extraction assembly 20 is located on the opposite end of the ionization chamber 12 from the chamber endwall 13 and cathode 14. The ion extraction assembly 20 includes a screen electrode 22, an accelerator or accel electrode 24 and a decelerator or decel electrode 26. The propellant, which is xenon gas in the preferred embodiment, is provided to the ionization chamber 12 by way of a gas manifold 28 through a plenum 30 with a small portion of the propellant being provided by the manifold 28 through the cathode 14. A neutralizer assembly 32 is positioned near the ionization chamber 12 and also receives a small portion of xenon gas flow from the manifold 28. The neutralizer assembly 32 includes a neutralizer cathode 34, a neutralizer heater 35 and a neutralizer keeper 36.

Figure 2:
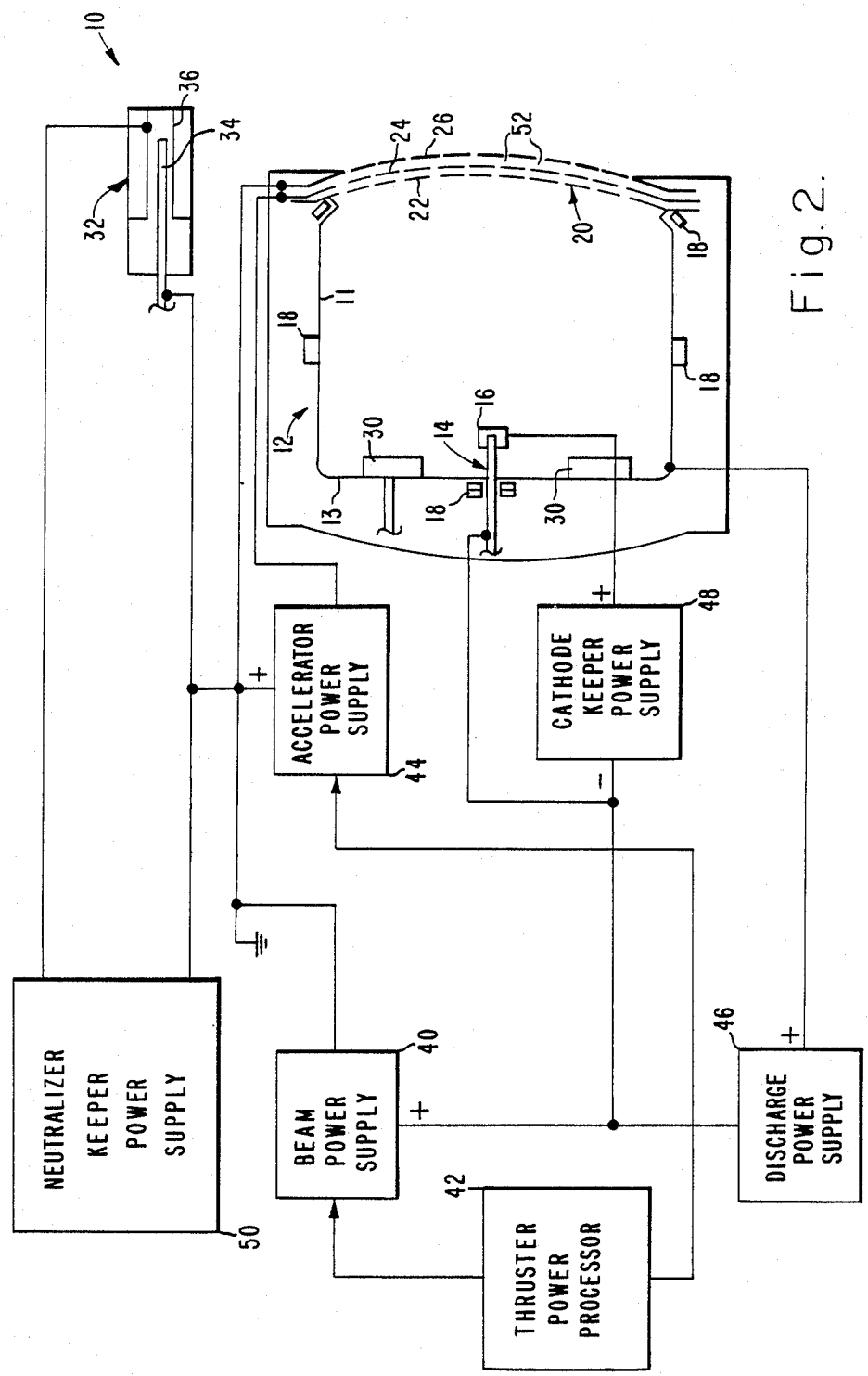
FIG. 2 is a schematic drawing of the power supply connections for the ion thruster of FIG. 1.

The electrical connections of the ion thruster 10 are shown schematically in FIG. 2. A beam power supply 40 is coupled between ground and the cathode 14. The output voltage of the beam power supply 40 is variable and is controlled by a thruster power processor 42. An accelerator power supply 44 is coupled between ground and the accel electrode 24 so as to provide a negative voltage to the accel electrode 24 relative to the voltage level of the ionization chamber 12. The output voltage of the accelerator power supply 44 is also variable and controlled by the thruster power processor 42. A discharge power supply 46 is coupled between the positive side of the beam power supply 40 and the ionization chamber 12 which includes the sidewall 11 and endwall 13 functioning as the anode. Thus, the discharge power supply 46 provides a potential difference between the cathode 14 and the anode. A cathode keeper power supply 48 is coupled between the cathode 14 and the cathode keeper 16 to supply the keeper 16 with a positive voltage relative to the cathode 14. A neutralizer-keeper power supply 50 supplies a voltage difference between the neutralizer cathode 34 and neutralizer keeper 36 with the neutralizer cathode 34 being coupled to ground. Heater power supplies (not shown) are provided for both the cathode heater 15 and the neutralizer cathode heater 35.

To begin operation of the thruster 10, current is passed through the electric cathode heaters 15 and 35 to initiate electron emission and voltage is applied to the cathode keeper 16 and neutralizer cathode keeper 36. Then, xenon gas flow is initiated from the manifold 28 with most of the gas passing through the plenum 30 into the ionization chamber 12 and with the manifold 28 passing a small part of the flow through the cathode 14 and through the neutralizer assembly 32. The xenon gas flow through the cathode 14 sweeps the electrons out through a cathode orifice into the ionization chamber 12. The electrons are accelerated to the anode sidewall 11 and endwall 13 by the voltage difference between the ionization chamber 12 and the cathode 14 generated by the discharge power supply 46. Ionization of the xenon gas which has entered the ionization chamber primarily through the plenum 30 occurs by collisions of the electrons and the neutral gas molecules. The percentage of ions in the ionization chamber 12 is about 10 to 15% of the total particle population. The thermionic electrons from the cathode 14 tend to be confined in the anode chamber 12 by a weak magnetic field set up by the permanent magnet rings 18 which are attached to the ionization chamber sidewall 11 and endwall 13. In the preferred embodiment, these magnets are made of samarium cobalt but the magnetic field could be generated by other types of permanent magnets or electromagnets. In this manner, a main discharge plasma is established in the ionization chamber 12.

The ion extraction assembly 20 is a three grid system in the preferred embodiment including the screen grid 22, the accel grid 24 and the decel grid 26. The positively charged xenon ions are accelerated past the screen grid 22 toward the negatively charged accel grid 24 by the electric field established between these first two grids. This electric field results from the voltage difference generated by the combined beam power supply 40 and discharge power supply 46 on the screen grid 22 and the accelerator power supply 44 on the accel grid 24. The ions are then decelerated by the potential difference between the decel grid 26 at ground potential and the accel grid 24. Each grid has a plurality of holes 52 which are aligned to pass the ions into space with a minimum angle of divergence. The stream of positively charged ions is made electrically neutral by the electrons discharged from the neutralizer assembly 32. Thrust is thereby developed by the stream of ions accelerated through the ion extraction assembly 20.

Figure 3A:
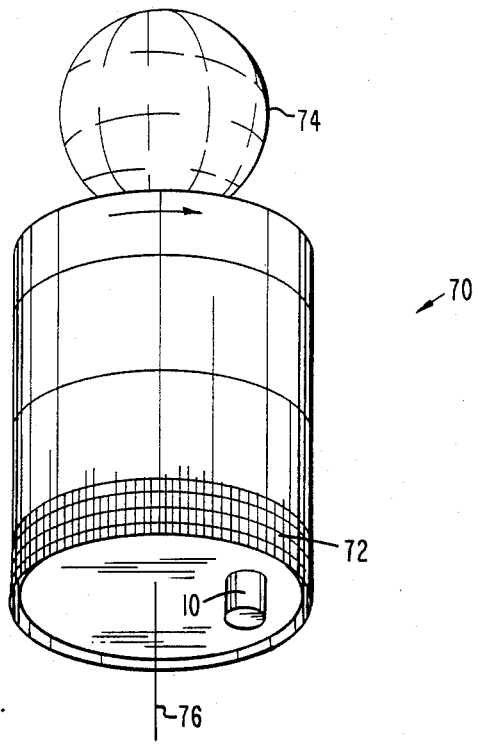
FIG. 3a is a perspective view of a dual-spin stabilized spacecraft utilizing the present invention.

As discussed above, the use of ion thrusters on a geostationary satellite for north-south stationkeeping is very attractive for its weight savings which can provide extended operational lifetime. As shown in FIG. 3a, the thruster 10 may be used with a dual-spin stabilized satellite 70 which includes a spinning rotor 72 and a despun payload platform 74 which may be nominally earth pointed. The rotor 72 and platform 74 are joined by a despin bearing having an axis parallel to the rotor spin axis 76. Because of payload requirements the platform 74 may be statically imbalanced with respect to the bearing axis and thus the spacecraft center of mass is offset from the spin axis 76. The electrostatic ion thruster 10 is mounted on the rotor 72, offset from the spin axis 76 with the axis of thrust parallel to the spin axis 76 which is nominally oriented normal to the orbital plane.

A spacecraft in geosynchronous earth orbit experiences a number of forces perturbing its orbit with the largest being the gravitational forces of the sun and moon which tend to increase the inclination of the orbit causing north-south drift. The spacecraft drift may be corrected by properly timed thruster firing at the appropriate orbital node. For prior art chemical or electrothermal thrusters, the off-axis thruster may be off-pulsed for each revolution of the rotor in order to achieve a spin-averaged thrust directed through the spacecraft center of mass or to provide attitude corrections by applying necessary torque. However, off-pulsing was not considered practical for electrostatic ion thrusters, thus leading to continued dependence on chemical thrusters which can be off-pulsed effectively.

The present invention provides thrust modulation for electrostatic ion thrusters by modulating the thrust level between two non-zero limits. This is accomplished by a complementary variation of the ion beam voltage $V_B$, which controls the exhaust velocity, and the accel voltage $V_A$ as shown in FIG. 4 such that the total accelerating voltage $V_{TOT} = V_B + |V_A|$ and thus the ion beam current remains constant. The voltage variations are controlled by the thruster power processor 42 which uses well known electronics to provide ramp voltages to the screen and accel grid. For any given mission, the exhaust velocity and thus the thrust is optimized and the ion current determined as if the thruster is located on-axis and firing through the center of mass. Upper and lower thrust levels are then chosen by varying the beam voltage (net acceleration voltage) above and below the value determined for optimum exhaust velocity. For the preferred embodiment, the beam voltage is varied between about +750 V and +300 V and the accel voltage is varied between about −300 V and −750 V thereby providing a constant total accelerating voltage $V_{TOT}$ of 1050 V which is sufficient to maintain a constant ion current. The net to total accelerating voltage $R = V_B/V_{TOT}$ is maintained between about 0.7 for nominal thrust and about 0.3 for 60% of nominal thrust as shown in FIG. 5. In order to provide efficient and reliable operation of the thruster 10 using the three-grid ion extraction assembly 20, the minimum operating R is about 0.3.

Generally, for velocity or orbit inclination control of the spin stabilized satellite 70 the ion thruster 10 is fired an integral number of spin periods centered on the appropriate orbital node (ascending or descending) and the thrust level is spin-synchronously modulated between the two non-zero levels as described above. Satellite attitude control may also be simultaneously provided. An exemplary modified square wave modulation waveform is shown in FIG. 5, with the ramp time shown exaggerated, but other waveforms such as a sinusoid may be used. The primary requirement for the modulation is that the generated waveform have a first Fourier component at spin frequency with the prescribed amplitude and phase selected based on the given range of thrust levels which can be achieved with the present invention while maintaining an approximately constant ion beam current. An intentional non-zero precession in the desired direction can be produced by varying the modulation waveform parameters e.g., peak to peak amplitude, duty cycle and phase. The resulting net torque impulses $h_1$ and $h_2$ about the two platform transverse axes designated 1 and 2 respectively, are directly related to the amplitude and phase of the spin frequency component of the modulation waveform. For these given net torque impulses and a spacecraft total angular momentum H, the attitude precession is $-h_2/H$ and $h_1/H$, respectively about the 1 and 2 axes for small angles.

Figure 3B:
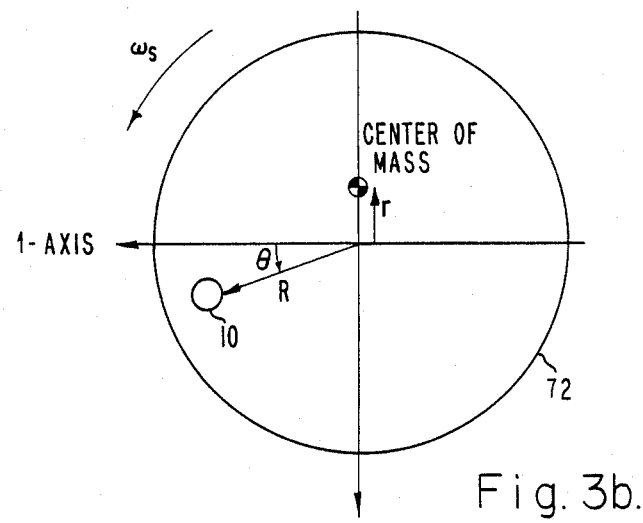
FIG. 3b is a schematic drawing showing a spacecraft coordinate system.

FIG. 3b is a schematic diagram showing the rotor 72 and thruster 10 projected onto a payload-fixed coordinate system. For a single axial thruster located a distance R from the spin axis of a spacecraft having a center of mass offset r from the spin axis, spin-synchronous modulation of the thrust produces a defined net torque impulse each spin period. For illustration, the payload coordinate frame centered on the spin axis is used in which the spacecraft center of mass offset is purely in the negative 2-axis direction. The instantaneous thrust, F is represented in terms of its Fourier components:

$$F = F_o + \sum_{k=1}^{n} F_{sk} \sin k\theta + \sum_{k=1}^{n} F_{ck} \cos k\theta$$

where $\theta$ is the angle from the payload 1-axis to the projection of the thruster position vector in the payload 1-2 plane. Integrating the resulting 1-axis moment, $M_1 = (R \sin \theta + r)F$ and 2-axis moment, $M_2 = (R \cos \theta)F$, over one spin period, $T = 2\pi/\omega_s$, the resulting 1— and 2-axis torque impulse is, respectively:

$$\begin{aligned} h_1 &= \int_0^T M_1 dt \\ &= \int_0^{2\pi} (R\sin\theta + r)(F_o + F_{s1}\sin\theta)\, d\theta/\omega_s \\ &= RF_{s1}T/2 + rF_o T \\ h_2 &= \int_0^T M_2 dt \\ &= \int_0^{2\pi} (R\cos\theta)(F_{c1}\cos\theta)\, d\theta/\omega_s \\ &= RF_{c1}T/2 \end{aligned}$$

The requirement for zero net torque impulse, or precession is thus:

$$F_{sl} = -(2r/R) F_o, \text{ and}$$

$$F_{cl} = 0$$

For squarewave modulation with amplitude ±y, meeting this requirement, $F_{sl} = -4y/\pi$ and thus $y = (\pi r/2R) F_o$ where $F_o$ is the average thrust, $F_o + y$ is the upper thrust value and the lower thrust value is $F_o - y$. The same result may be achieved with the same upper thrust but lower low thrust level by adjusting the duration of the low thrust portion for each period as with the example of FIGS. 4 and 5. In this case variations in low thrust duration and waveform phase about nominal can be used to produce non-zero torque impulses $h_1$ or $h_2$ and hence attitude corrections in any desired direction.

Figure 6:
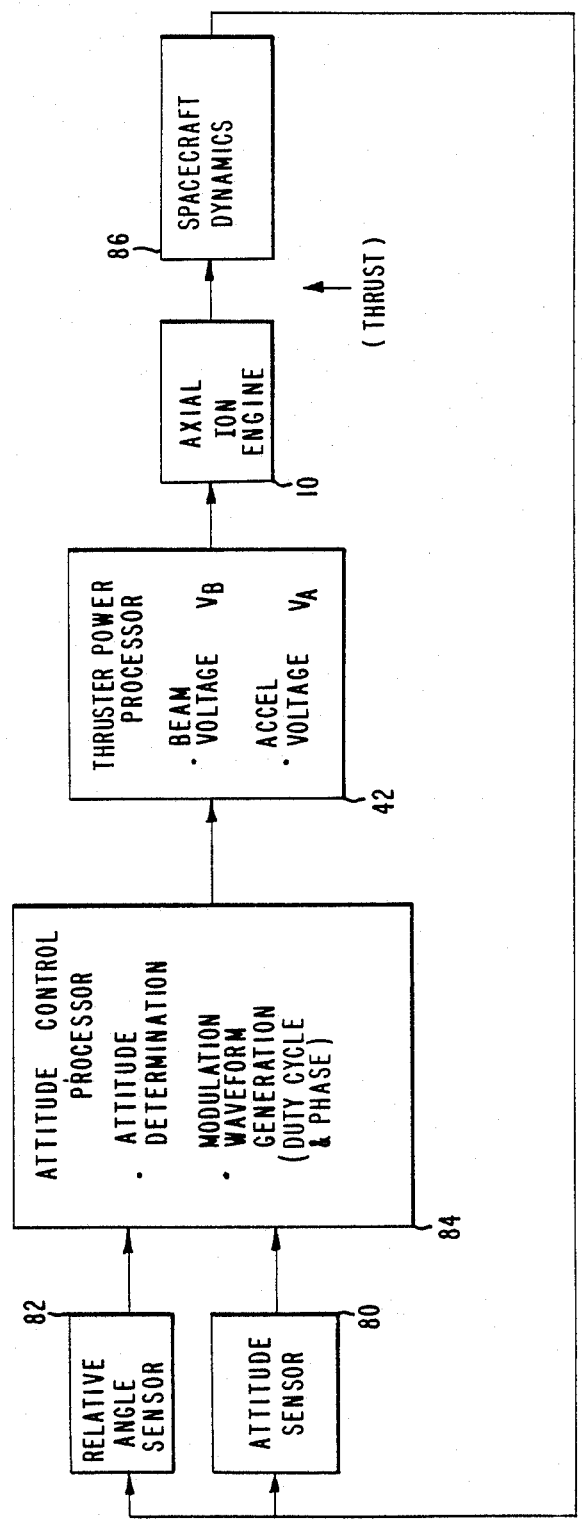
FIG. 6 is a schematic diagram showing the ion thruster control system.

FIG. 6 shows a schematic diagram for control of the ion thruster in practicing the present invention. An attitude sensor 80 uses one of several known techniques to sense the spacecraft attitude. A relative angle sensor 82 senses the relative position of the rotor 72 and platform 74. Information from these sensors is input to an attitude control processor 84 which determines the current spacecraft attitude and generates the appropriate modulation waveform to achieve the desired attitude. The generated waveform includes both the thruster firing duty cycle and the desired phase referenced to the output of the relative angle sensor 82. This waveform is provided to the thruster power processor 42 which, as shown in FIG. 2, controls the beam voltage $V_B$ from the beam power supply 40 and the accel voltage $V_A$ from the accelerator power supply 44. The modulation of the beam and accel voltages causes a corresponding modulation in the thrust from the ion thruster 10. Firing the thruster 10 in turn affects the spacecraft dynamics represented by box 86 and this is sensed in turn by the attitude sensor 80 and relative angle sensor 82.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. An electrostatic ion thruster with thrust modulation comprising:
   means for providing a gaseous propellant;
   means for ionizing said gaseous propellant to generate a plasma;
   means for containing said plasma;
   an ion extraction assembly for extracting a beam of positively charged ions from said plasma,
   said extraction assembly including a screen electrode and an accel electrode, said screen electrode being positioned between said accel electrode and said plasma; and
   voltage control means for complementary modulation of the voltage potentials of said screen electrode and said accel electrode such that a substantially constant potential difference is maintained therebetween;
   whereby a relatively constant ion beam current is maintained while the thrust from said ion thruster is modulated.

2. The electrostatic thruster of claim 1 wherein said screen electrode is maintained at the same potential as said containing means and said potential is in the range of about $+300$ volts to 750 volts and wherein said accel electrode potential is maintained in the range of about $-750$ volts to $-300$ volts such that said constant potential difference between said screen electrode and said accel electrode is about $+1050$ volts.

3. The electrostatic ion thruster of claim 1 wherein said gaseous propellant is xenon.

4. The electrostatic ion thruster of claim 1 wherein said ion extraction assembly further includes a decel electrode positioned on the opposite side of said accel electrode from said screen electrode.

5. The electrostatic ion thruster of claim 4 wherein each electrode of said ion extraction assembly is a grid electrode including a plurality of apertures such that there is a beam path alignment between corresponding apertures in adjacent grids.

6. The electrostatic ion thruster of claim 5 wherein said ion extraction assembly has a concave shape as viewed from said plasma containing means.

7. The electrostatic ion thruster of claim 1 wherein said ionizing means includes a cathode for providing thermionic electrons, an anode for accelerating said thermionic electrons to velocities sufficient to ionize said gaseous propellant, and magnetic containment means for lengthening the path traveled by said thermionic electrons.

8. The electrostatic ion thruster of claim 1 and further including a neutralizer for providing a stream of electrons to neutralize the space charge of said beam of positively charged ions after extraction from said plasma.

9. A dual-spin stabilized spacecraft comprising:
   a nominally despun platform;
   a nominally spun rotor which rotates relative to said platform about a rotational axis;
   an electrostatic ion thruster positioned on said rotor off the rotational axis of said rotor for providing axial thrust by generating a charged ion beam;
   means for modulating the thrust of said ion thruster between an upper thrust value and a lower thrust value; and
   means for maintaining the ion beam current from said thruster substantially constant for all thrust values.

10. The dual-spin stabilized spacecraft of claim 9 wherein said spacecraft has a center of mass which is located off the rotational axis of said rotor and wherein said modulating means includes means for controlling the thrust in a manner to provide a spin-averaged thrust directed through said spacecraft center of mass.

11. The dual-spin stabilized spacecraft of claim 10 wherein attitude control of said spacecraft is provided by thrust modulation of said ion thruster in response to signals from said controlling means to generate a net torque about a spacecraft axis normal to said rotational axis.

12. A method of operating an electrostatic ion thruster including an ion extraction assembly having a screen electrode and an accel electrode, said method comprising the steps of:
   providing a relatively constant flow of a gaseous propellant to an ionization chamber;
   ionizing said gaseous propellant to generate a plasma of positively charged ions and negatively charged electrons;
   extracting a beam of positively charged ions from said plasma with said ion extraction assembly by maintaining a positive voltage on said screen electrode and a negative voltage on said accel electrode; and
   modulating the voltage on said screen and accel electrodes between predetermined bounds while maintaining a substantially constant potential difference between said electrodes;
   whereby thrust modulation is achieved while maintaining substantially constant ion beam current.

13. The method of claim 12 wherein said ion thruster is positioned on a spin stabilized satellite and further including the step of generating a waveform for said voltage modulation to provide a prescribed Fourier component of the thrust amplitude and phase at a satellite spin frequency.

* * * * *